Patented Jan. 9, 1951

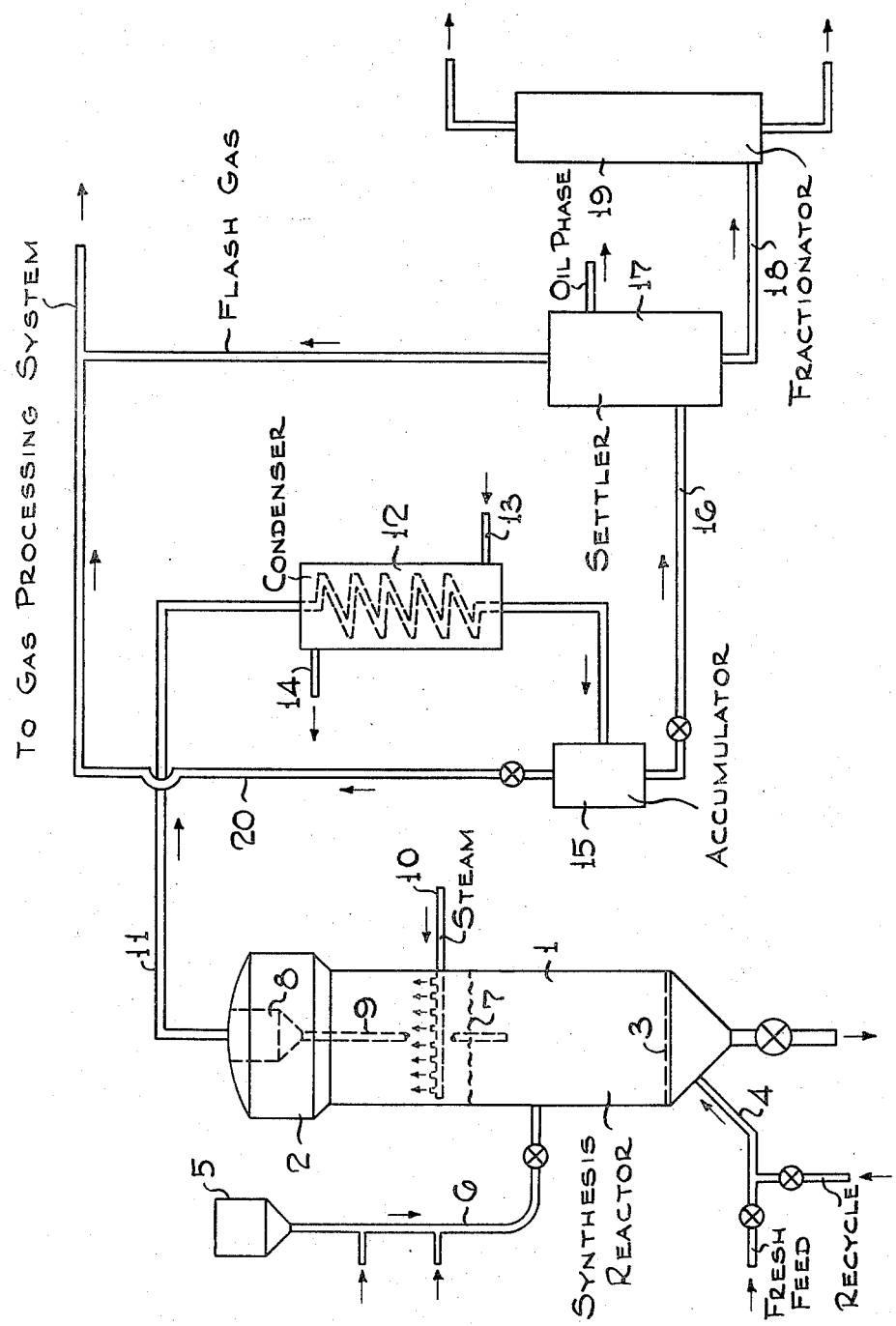

2,537,178

UNITED STATES PATENT OFFICE 2,537,178

METHOD OF MINIMIZING ESTER FORMATION IN HYDROCARBON SYNTHESIS

Charles H. Worsham, Fanwood, N. J., assignor to Standard Oil Development Company, a corporation of Delaware Application February 20, 1948, Serial No. 9,644

5 Claims. (Cl. 260—449.6)

This invention relates to the synthesis of hydrocarbons and oxygenated hydrocarbons from carbon monoxide and hydrogen. More particularly, this invention relates to a process for increasing the amount of acids and alcohols which may be recovered from such synthesis process.

It is well known in the art that mixtures of carbon monoxide and hydrogen when brought into intimate contact with suitable catalysts under suitable reaction conditions are converted into hydrocarbons and oxygenated hydrocarbons. It is also known that the nature of the products are in general a function of the reaction conditions, such as temperature, pressure, contact time, feed gas ratio, and the nature of the catalyst. Thus it has been established that in general increasing the pressure favors the formation of oxygenated organic products and also that alkali metal promoted iron type catalysts favor oxygenated conversion products as against the cobalt-type catalysts.

These oxygenated compounds which appear in the product of the catalytic reaction between CO and $H_2$, and which may in accordance with the reaction conditions, amount to as much as 50% of the liquid yield, and include alcohols, aldehydes, ketones, acids, and esters, are found distributed between the product water and oil layers of the first product condensate of the conventional fluid or fixed bed hydrocarbon synthesis. These oxygenated organic products have a considerable commercial value and their recovery by economic methods may improve substantially the economic aspects of the hydrocarbon synthesis. Particularly the lower alcohols, such as ethyl and propyl are of the highest technical and commercial importance and interest, as are also the lower molecular weight carboxylic acids, as acetic and propionic. Of somewhat less importance are the esters and the carbonyl compounds and the higher molecular weight products, which appear in smaller quantities.

In order to increase the economic attractiveness of the hydrocarbon synthesis process as a means for manufacturing valuable low molecular weight alcohols and acids, it is most desirable to produce these at the expense of the less valuable oxygenated products, such as esters. It is true that esters, once obtained and isolated, may be converted subsequently into alcohols and acids by hydrolysis or saponification, but this would add two further steps to the process with accompanying increased cost of equipment, chemicals, and time.

It is, therefore, the principal object of the present invention to provide an improved process for increasing the yield of alcohols and acids from the catalytic synthesis of hydrocarbons and oxygenated hydrocarbons from carbon monoxide and hydrogen.

Another object of the invention is to increase the yield of oxygenated products present in the water layer resulting from the hydrocarbon synthesis product and concomitantly to decrease the quantity of oxygenated product present in the oil layer resulting from said synthesis.

Other and further objects and advantages will appear hereinafter.

It has now been found experimentally that the addition of steam to the hot products zone following the catalytic reaction zone materially decreases the amount of ester that is obtained in the final product and also substantially increases the yield of low molecular weight acids and alcohols that are recovered from the aqueous layer in the product recovery portion of the hydrocarbon synthesis plant. Thus injection of water into the disengaging section of a fluidized solids hydrocarbon synthesis reactor at a rate equivalent to the product water being formed resulted in a 40% reduction of esters recovered, while total yield of oxygenated products recovered, based on the synthesis gas converted, increased about 9%, while the yield of water soluble alcohols increased 40%, that of water soluble acids 30%.

The addition of steam to the hydrocarbon synthesis reaction has been previously disclosed, but in these disclosures the steam was added with the synthesis gas to the catalyst in the reaction chamber in order to modify the reaction conditions and decrease carbon formation on the catalyst. It has been found that adding steam with the synthesis gas noticeably cuts down carbon formation in the catalyst, yet this effect is accompanied, over an extended period, by a certain decrease in catalyst activity and selectivity to oxygenated products. In the case of highly active catalysts this decrease in activity can be absorbed where the paramount consideration is the prevention of catalyst carbonization. In the present invention, however, this catalyst deactivating effect is completely eliminated. In accordance with the present invention, therefore, steam is not added to the catalyst but to the products of the synthesis substantially at synthesis temperatures.

The invention has the further advantage that by its application oxygenated products are preferentially obtained in the aqueous phase than in the oil phase in the separator. It is relatively simple to recover oxygenated products from the water layer resulting from the synthesis by such processes as simple distillation, extraction, extractive distillation, and the like. It is a far more difficult matter to recover oxygenated products from the oil layer. In practice, these products are not generally recovered but the oil layer as a whole is treated with some dehydrating agent such as bauxite and the oxygenated products converted to olefinic material for motor fuel. By this invention, therefore, the esters which normally would be soluble in and found in the oil layer are found in their component constituents as low molecular weight alcohols and acids in the water layer.

The mechanism by which the ester formation is inhibited and the formation of alcohols and acids favored is not too clear. The steam may have the effect of shifting the equilibrium in the direction favoring hydrolysis of ester that is formed lower down in the catalyst bed, though the decrease in ester content and increase of acid and alcohol are substantially above that predicted by mass action considerations. Another possible effect of the steam in increasing the oxygenated products content of the water layer may be in decreasing the solubility of oxygenated products in the oil layer in favor of the water layer.

Having set forth the general nature and object of the invention the latter will best be understood from the more detailed description hereinafter, in which reference will be made to the accompanying drawing which shows a semi-diagrammatic view of a system suitable to practice a preferred embodiment of the invention.

Referring now in detail to the drawing the system illustrated therein comprises essentially a synthesis reactor 1, a product condenser 12, and a water phase fractionator 19, the functions of which are explained below.

Synthesis reactor 1 contains synthesis catalyst of any suitable composition known in the art of hydrocarbon synthesis, such as reduced oxides of iron or cobalt, supported, if desired, on carriers, such as kieselguhr, silica gel, etc., and containing small amounts from 0.5–10% of suitable promoters. Best results with respect to formation of oxygenated products are obtained with iron catalyst promoted with alkali promoters, such as potassium carbonate. While the catalyst may be employed in the form of a fixed bed, it is preferred to use the fluidized solids technique, because of the considerable advantages with respect to temperature control and process design.

In accordance with the preferred embodiment of the invention, therefore, synthesis reactor 1 is a reactor preferably in the form of a vertical cylinder with a conical base and with an upper expanded section 2 and having a grid or screen 3, located in the lower section to effect good gas distribution. Reactor 1 is charged with a finely divided alkali-promoted iron catalyst having a particle size of from about 100–400 mesh, preferably about 200 mesh. The synthesis gas mixture, having a molar ratio of $H_2/CO$ varying between 0.5–3:1, preferably between about 1:1 and 2:1, is introduced into reactor 1 through line 4 and flows upward through grid 3. Catalyst may be supplied to reactor 1 from catalyst hopper 5 through aerated stand pipe 6. The linear velocity of the gases within reactor 1 is kept within the approximate range of 0.1–3 feet per second, preferably about 0.4–1.0 foot per second so as to maintain the catalyst in the form of a dense, highly turbulent, fluidized mass having a well-defined upper level 7, and an apparent density of from about 30 to 150 pounds per cubic foot depending upon the fluidization conditions. The pressure within reactor 1 is kept within the approximate range of 150 to 700 p. s. i. g. preferably within the limits of from about 250 to about 450 p. s. i. g. Only a small proportion of the powdered catalyst is carried into the disengaging section 2 of the reactor above level 7, and these catalyst particles are separated from the reaction products in a conventional gas-solids separator, such as cyclone 8 and are returned to the catalyst zone of reactor 1 through dip pipe 9. The reaction temperature is kept constant at about 500°–700° F. preferably at about 600°–675° F, and surplus heat from the exothermic reaction may be withdrawn by any conventional means, such as internal or external coils (not shown).

To provide the ester formation inhibiting step of the invention, a stream of steam at a temperature and pressure of the same order of magnitude as that obtaining in the disperse phase above upper level 7 is injected into reactor 1 a short distance above level 7 and above the catalyst inlet, through a number of uniformly spaced distributors located in a manifold 10. The injection of steam is preferably so controlled that the concentration of acids in the resulting water layer is not substantially less than about 4–5%, in order to make recovery attractive economically; in practice, this means that steam is added in an amount and at a rate about equal to that at which it is formed in the hydrocarbon synthesis reaction.

Product vapors and gases are withdrawn overhead from reactor 1 and are passed through line 11 into product condenser 12 which is cooled to about room temperature by any suitable cooling agent such as water supplied through line 13 and withdrawn through line 14. Condensed products and uncondensed gases pass to a liquid products accumulator 15 wherein the liquid is separated from the gas. The liquid is withdrawn from the bottom of accumulator 15 through line 16, and the gas leaves accumulator 15 overhead through line 20 for further processing in a manner known per se.

The liquid product containing hydrocarbons, oxygenated hydrocarbons and water, is passed through line 16 to a separator or settler 17 wherein the relatively light oil phase is separated from the relatively heavy water phase containing most of the oxygenated products. The two phases are separated, the water phase containing the oxygenated products being withdrawn downwardly from settler 17 and passed through line 18 into a fractionating column 19; where oxygenated products are recovered in a manner known per se. The oil layer from separator 17 may also be processed to recover oxygenated products, as by extraction or distillation, or it may be treated with a dehydrating agent, such as bauxite, to convert oxygenated products into olefinic materials of high octane value, all in a manner known in the art.

The embodiment of the invention illustrated by the drawing permits of numerous modification. Thus in order to provide a longer period of time for the steam to interact with the products from the synthesis, it may be desirable to include a second reaction chamber above cyclone 8 kept at substantially the same reaction conditions as the disengaging zone 2. Steam for the process may be generated by suitable means from the exothermic heat of reaction occurring in reaction vessel 1. Other modifications within the scope of the invention will occur to those skilled in the art.

To illustrate more clearly the nature, advantages, and results, of the invention, the following specific example of results obtained in a particular comparative series of tests made by the inventor is given:

*Effect of steam on formation of esters and on water-soluble organic products*

Synthesis conditions:
- Temperature _____ 650° F.
- Pressure _____ 400 p. s. i. g.
- Throughput _____ 13 v/hr./w. (S. C. F.[1] of F. F.[2]/hr./lb. of catalyst)
- Recycle/fresh feed ratio. 2/1
- $H_2$/CO fresh feed ratio __ 1/1
- Superficial inlet velocity 0.33 ft./sec.
- Catalyst _____ Red iron oxide, $K_2CO_3$ promoted, hydrogen sintered.

[Liquid oxygenated products yield—cc./m.[3] of converted $H_2$ CO.]

| Ratio of Added Water to Product Water | None | 1:1 |
|---|---|---|
| Total Water in product, cc./m.[3] | 132 | 258 |
| Per Cent, Conversion, $H_2$+CO | 95.6 | 95.1 |
| Product Oil, cc./m.[3] | 141 | 134 |
| Water Phase: | | |
| Alcohols | 10.1 | 14.3 |
| Carbonyl Cpds | 4.0 | 6.8 |
| Acids | 10.0 | 13.1 |
| Esters | 1.1 | 0.2 |
| Total in Water Phase | 25.2 | 34.4 |
| Oil Phase: | | |
| Alcohols | 12.6 | 13.2 |
| Carbonyl Cpds | 11.5 | 12.9 |
| Acids | 13.7 | 12.6 |
| Esters | 9.3 | 6.0 |
| Total in Oil Phase | 47.1 | 44.7 |
| Total Oil+Water Phases: | | |
| Alcohols | 22.7 | 27.5 |
| Carbonyl Cpds | 15.5 | 19.7 |
| Acids | 23.7 | 25.7 |
| Esters | 10.4 | 6.2 |
| Total Oxygenated Cpds | 72.3 | 79.1 |

[1] Standard cubic feet.
[2] Fresh feed.

The above data show an increase of water-soluble alcohol yield of about 40% for the process of the invention as compared with the conventional method of operating. This is accompanied by a 30% increase in water-soluble acid yield and by about a 40% decrease in undesirable ester yield. The amount of oil-phase alcohols and acids formed with and without the steam addition step of the reaction remains relatively unaffected.

While the foregoing description and exemplary operation have served to illustrate specific applications and results of the invention, other modifications obvious to those skilled in the art are within the scope of the invention.

What is claimed is:

1. The process of producing water soluble oxygenated hydrocarbons from carbon monoxide and hydrogen which comprises contacting a gas mixture containing carbon monoxide and hydrogen in synthesis proportions and under synthesis conditions comprising temperatures in the range of from about 500° to about 700° F. and pressures in the range of from about 150 to about 700 p. s. i. g. with a dense fluidized mass of finely divided iron containing promoted synthesis catalyst in a reaction zone, maintaining a dense fluidized bed of catalyst in said reaction zone, maintaining a disperse catalyst phase directly above said dense phase, withdrawing a mixture of vaporous reaction products and unreacted gases from said dense phase, passing said mixture into said disperse phase, injecting steam from a source outside of said dense phase into said disperse phase, maintaining said steam substantially out of contact with the bulk of said synthesis catalyst within said reaction zone, whereby oxidation of the bulk of said catalyst by said added steam is substantially prevented, condensing said reaction products, and recovering a product relatively rich in water-soluble oxygenated hydrocarbons.

2. The process of claim 3 in which the temperature maintained in said disperse catalyst phase is substantially the same as that maintained in said dense phase.

3. The process of claim 1 in which said steam is at substantially the same pressure and temperature as the temperature and pressure in said dense phase reaction zone.

4. The process of claim 1 in which steam is injected into said disperse catalyst phase at approximately the same rate that steam is withdrawn from the dense phase catalyst zone.

5. In the process of making synthetic hydrocarbons and oxygenated hydrocarbons from CO and $H_2$ by passing a gasiform stream initially containing CO and $H_2$ upwardly through a confined bed of finely divided iron-containing solid hydrocarbon synthesis catalyst under superatmospheric pressure at an elevated temperature favorable for the formation of both hydrocarbons and oxygenated hydrocarbons, the step of increasing the relative amounts of oxygenated hydrocarbons formed, comprising introducing a predetermined amount of steam into the stream of hot reaction products immediately after it emerges from said bed, said predetermined amount of steam being at substantially the same pressure and temperature as the temperature and pressure in said confined bed, maintaining said steam substantially out of contact with the bulk of said catalyst within said reaction zone, whereby oxidation of the bulk of said catalyst by said added steam is substantially prevented, condensing said reaction products, and recovering a product relatively rich in water soluble oxygenated hydrocarbons.

CHARLES H. WORSHAM.

REFERENCES CITED

The following references are of record in the file of this patent:

UNITED STATES PATENTS

| Number | Name | Date |
|---|---|---|
| 2,183,146 | Michael | Dec. 12, 1939 |
| 2,231,990 | Dreyfus | Feb. 18, 1941 |
| 2,347,682 | Gunness | May 2, 1944 |
| 2,417,164 | Huber | Mar. 11, 1947 |
| 2,424,467 | Johnson | July 22, 1947 |

OTHER REFERENCES

Unit Processes in Organic Synthesis, Groggins (third edition—page 620—no drawing).